No. 759,007. PATENTED MAY 3, 1904.
J. T. NIBLETT.
STORAGE BATTERY.
APPLICATION FILED FEB. 5, 1903.
NO MODEL.
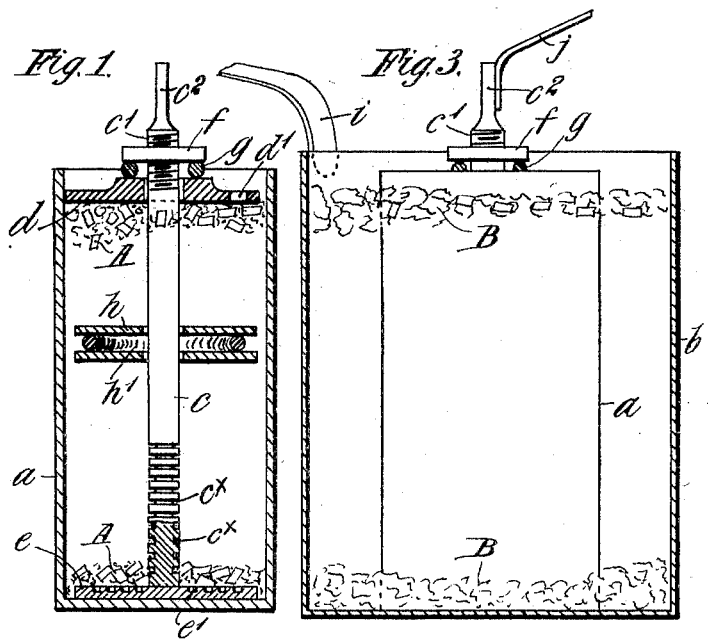
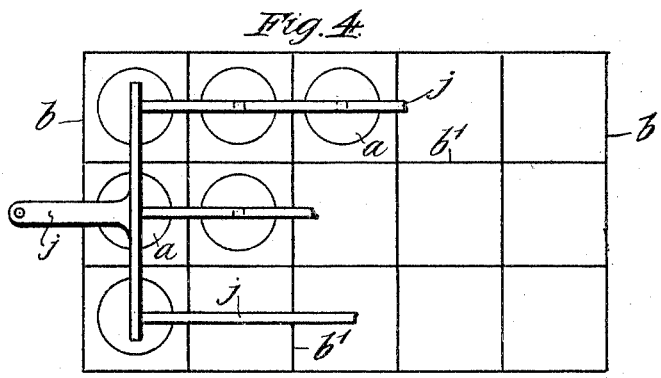
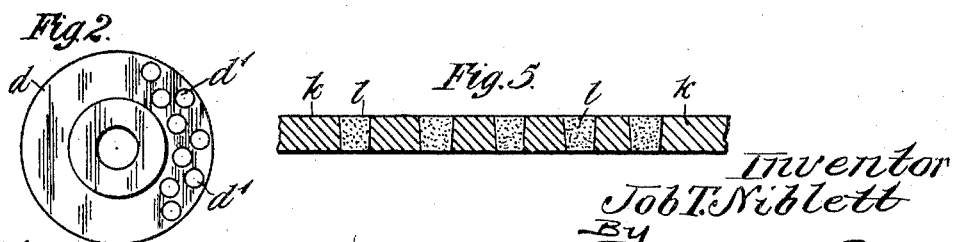
Inventor
Job T. Niblett
By
James L. Norris.
Atty
Witnesses:
James L. Norris.
C. D. Kesler.

No. 759,007. Patented May 3, 1904.

UNITED STATES PATENT OFFICE.

JOB THOMAS NIBLETT, OF GREENWICH, ENGLAND.

STORAGE BATTERY.

SPECIFICATION forming part of Letters Patent No. 759,007, dated May 3, 1904.

Application filed February 5, 1903. Serial No. 142,038. (No model.)

*To all whom it may concern:*

Be it known that I, JOB THOMAS NIBLETT, electrical engineer, a subject of the King of Great Britain, residing at 30 Stockwell street, Greenwich, in the county of Kent, England, have invented certain new and useful Improvements in and Relating to Storage and other Batteries, of which the following is a specification.

This invention has reference to that type of battery in which the cells are filled with granules or pellets which form the elements.

The said invention is designed to produce a cell which shall be practically solid and will be readily understood by reference to the annexed drawings, in which—

Figure 1 is a vertical section through porous cell containing the positive-pole element. Fig. 2 is a plan of one of the compression-plates used in the battery, showing the perforations in the said plates. Fig. 3 is a vertical section of one of the complete cells. Fig. 4 shows a larger type of cell in which a number of positive-pole elements are arranged in separate compartments in a single outer negative cell. Fig. 5 is a detail section showing how a portion of the granules are molded.

$a$ is a porous vessel.

$b$ is an outer containing cell or vessel of lead, preferably forming the negative conductor of the element, and $c$ is the central conductor of the positive-pole element. As shown, the conductor $c$ is embedded in a packing of granular material A, which forms in reality the positive-pole element and fills the porous cell $a$. The latter is also in its turn embedded in granular lead or the like B, which constitutes the negative-pole element.

The outer vessel $b$ is painted over internally with a mixture such as that which the pellets, hereinafter described, are formed of. As soon as this mixture is dry the cell $b$ is filled, and when the current is passed through it the coating becomes reduced and leaves a layer of spongy lead on the inner face of the cell-walls, which incorporates itself readily with the granules or pellets.

In order to render the contents of the porous cell equivalent practically to a solid body, the cells may be provided with upper and lower compression-plates. In the present case the positive-pole cell is shown with two such plates $d$ $e$, the former of which is acted on by a nut $f$, having a rubber or other elastic ring $g$ interposed between it and the plate $d$. The nut works on a screw-threaded portion $c'$ at the top of the conductor $c$, and by turning it the plate $d$ can be forced down onto the granules or pellets, so compressing them and preventing them from working loose. Expansion of the mass is allowed for, however, by the compressible nature of the elastic ring.

In order to provide more freedom of expansion throughout the mass, intermediate plates $h$, separated by elastic washers $h'$, may be arranged at intervals between the upper and lower plates $d$ $e$.

The lugs $i$ $j$ for conveying current to and from the battery are soldered to the negative-pole cell $b$ and to the flat extremity or lug $c^2$ of the positive conductor $c$.

The various plates $d$, $e$, and $h$ may be perforated, as shown at $d'$, and may be provided with circular grooves filled with active material. The conductor $c$ may also be provided with grooves $c^\times$, as shown, in which active material may be placed. In this way the capacity of the cells is increased without materially affecting the conductivity. The cell is thus rendered practically solid as regards its mechanical construction, while, however, it still possesses great capacity for the electrolyte, which fills the spaces between the granules. These granules may consist of any suitable substance adapted to form the active material. I find it advantageous, however, to use a mixture of two kinds of granules, one kind being formed of granulated lead or lead alloy and the other of molded pellets of lead oxid mixed with kieselguhr.

The lead or alloy granules are formed by pouring melted lead into water which is nearly at the boiling-point. In this way a much more effective granulation is obtained, because the molten lead produces a flash of steam the moment it strikes the water, and such steam scatters and opens out the lead granule in a very effective way, forming light flaky shell-like granules.

The molded pellets consist of a paste of lead oxid mixed with, say, about two per cent., by weight, of kieselguhr (infusorial earth) to give it permeability. This is plastered over a mold-plate k, Fig. 5, having slightly conical apertures l, so that it fills the said apertures, the excess being scraped off. As soon as the mass is set the plate is turned over, and a slight blow will disengage all the pellets from the holes, so that they are ready for use.

Each of the cells may be filled with a mixture of both kinds of granules; but in some cases they might be filled with metallic granules only. These latter may in either case be coated with a mixture of lead oxid in any suitable way.

The cell is practically ready for charging immediately it is made and has an enormous capacity with a very steady output.

The arrangement shown in Fig. 4 is analogous to that just described with the exception that the outer cell b consists of a box or trough having lead partitions b' extending across it both ways and electrically connected to its walls. All the compartments thus form, as it were, negative-pole cells grouped in parallel, while the positive-pole porous cells a are similarly grouped in parallel by a system of conductors j.

Suitable accessories, such as tubes, for the insertion of a hydrometer and also means for preventing the corrosion of the contacts may be provided, if desired.

What I claim, and desire to secure by Letters Patent of the United States, is—

1. A battery having as its active material a mixture of granulated lead and granules of lead oxid incorporated with kieselguhr.

2. A battery comprising an outer conductor, an inner cell containing the opposite conductor, and active material consisting of a mixture of granules of lead and lead oxid filling the spaces inside and outside said cell, substantially as described.

3. An inner electrode for a battery, comprising a receptacle, a granule mass forming the active material and consisting of lead and lead oxids, and means for keeping the mass compressed while allowing for expansion thereof.

4. An inner electrode for a battery comprising a receptacle, a conductor centrally arranged therein, active material surrounding said conductor, upper and lower clamping-plates mounted on said conductor and holding the active material between them, a compression-nut on said conductor, and an elastic washer between said nut and the upper plate, substantially as described.

5. An inner electrode for a battery comprising a receptacle, a conductor situated therein, a granule mass of active material, an upper and lower plate between which the charge is kept in position, means for pressing the upper plate onto the charge, intermediate plates inserted in the body of the charge, and an elastic ring between said plates for keeping them apart while allowing of expansion, substantially as described.

6. In a battery the combination of an outer trough or vessel, partitions dividing the same into compartments and also forming the negative electrodes, porous cells inside said partitions, a granule filling or mass inside said cells, and means for keeping the said mass in position while allowing for the expansion and contraction thereof, substantially as described.

7. In a battery the combination of a positive element consisting of a mass of lead and lead oxid in granules, a porous cell containing said mass, a further mass of granules surrounding said cell, and positive and negative conductors in contact with the said granule masses, substantially as described.

8. A battery comprising an outer conducting vessel, a porous vessel containing the opposite conductor, and a mass of granules forming the active material and filling the spaces inside and outside the porous vessel, substantially as described.

9. In an electrode for a battery, the combination of a porous receptacle, a granule mass of active material, a conductor, and means for keeping the mass compressed while allowing for expansion thereof.

In testimony whereof I have hereunto set my hand, in presence of two subscribing witnesses, this 20th day of January, 1903.

JOB THOMAS NIBLETT.

Witnesses:
C. BARNARD BURDON,
JOSEPH LAKE.